United States Patent
Shirakawa et al.

(10) Patent No.: US 9,321,963 B2
(45) Date of Patent: Apr. 26, 2016

(54) FLAME-RETARDANT STYRENE THERMOPLASTIC RESIN COMPOSITION AND MOLDED PRODUCT THEREOF

(75) Inventors: Nobuaki Shirakawa, Ichihara (JP); Kosuke Shirotani, Ichihara (JP); Masashi Matsuda, Ichihara (JP)

(73) Assignee: TORAY INDUSTRIES, INC., Tokyo (JP)

( * ) Notice: Subject to any disclaimer, the term of this patent is extended or adjusted under 35 U.S.C. 154(b) by 357 days.

(21) Appl. No.: 13/821,780

(22) PCT Filed: Sep. 21, 2011

(86) PCT No.: PCT/JP2011/071427
§ 371 (c)(1),
(2), (4) Date: May 6, 2013

(87) PCT Pub. No.: WO2012/039410
PCT Pub. Date: Mar. 29, 2012

(65) Prior Publication Data
US 2013/0221293 A1 Aug. 29, 2013

(30) Foreign Application Priority Data
Sep. 22, 2010 (JP) .................................. 2010-212430

(51) Int. Cl.
C09K 21/12 (2006.01)
C08L 25/12 (2006.01)
C08L 51/04 (2006.01)
C08K 5/523 (2006.01)
C08L 55/02 (2006.01)

(52) U.S. Cl.
CPC .............. C09K 21/12 (2013.01); C08L 25/12 (2013.01); C08K 5/523 (2013.01); C08L 51/04 (2013.01); C08L 55/02 (2013.01)

(58) Field of Classification Search
None
See application file for complete search history.

(56) References Cited

U.S. PATENT DOCUMENTS

| 6,441,069 B1 | 8/2002 | Honma et al. |
| 8,779,073 B2 * | 7/2014 | Mehta ................. C08K 3/0033 524/101 |
| 2006/0008664 A1 * | 1/2006 | Wakabayashi ..... A44B 18/0069 428/516 |
| 2006/0106141 A1 | 5/2006 | Yi et al. |
| 2009/0118412 A1 * | 5/2009 | Mehta .................... C08L 83/04 524/442 |
| 2011/0046265 A1 * | 2/2011 | Mehta .................... C08L 83/04 523/400 |

FOREIGN PATENT DOCUMENTS

| JP | 59-024736 | 2/1984 |
| JP | 60-004550 | 1/1985 |
| JP | 05-247315 | 9/1993 |
| JP | 06-157866 | 6/1994 |
| JP | 7-033971 A | 2/1995 |
| JP | 07-070448 | 3/1995 |
| JP | 11-005869 | 1/1999 |
| JP | 11-140270 A | 5/1999 |
| JP | 2000044767 | 2/2000 |
| JP | 2001-049064 A | 2/2001 |
| JP | 2007-270156 A | 10/2007 |
| JP | 2008-501849 A | 1/2008 |
| JP | 2008-143997 | 6/2008 |

OTHER PUBLICATIONS

International Search Report dated Dec. 20, 2011, application No. PCT/JP2011/071427.

* cited by examiner

*Primary Examiner* — Joseph D Anthony
(74) *Attorney, Agent, or Firm* — RatnerPrestia

(57) ABSTRACT

A flame-retardant styrene thermoplastic resin composition including 6 to 15 parts by weight of a phosphoric acid ester flame retardant (II) and 0.1 to 3 parts by weight of an aromatic carbonate oligomer (III) having a viscosity average molecular weight [Mv] of 1,000 to 10,000 with respect to 100 parts by weight of a styrene resin (I), and molded products thereof have excellent flame retardancy, mechanical properties and moldability.

9 Claims, No Drawings

FLAME-RETARDANT STYRENE THERMOPLASTIC RESIN COMPOSITION AND MOLDED PRODUCT THEREOF

CROSS REFERENCE TO RELATED APPLICATIONS

This application is the U.S. National Phase application of PCT/JP2011/071427, filed Sep. 21, 2011, and claims priority to Japanese Patent Application No. 2010-212430, filed Sep. 22, 2010, the disclosures of both are incorporated herein by reference in their entireties for all purposes.

FIELD OF THE INVENTION

The present invention relates to a flame-retardant styrene thermoplastic resin composition and a molded product thereof.

BACKGROUND OF THE INVENTION

Since styrene resins represented by ABS resins have excellent mechanical properties, moldability and electric insulation properties, they are used in a wide range of fields such as various parts for home electric appliances, office automation equipment and automobiles. However, since most of the plastics comprising styrene resins are flammable, various techniques have been proposed for achievement of flame retardancy in view of safety.

In general, a method wherein a chlorine flame retardant and a bromine flame retardant having high flame retardancy efficiencies and antimony oxide are blended in a resin is employed for achieving flame retardancy. However, since this method uses a large amount of flame retardants for prevention of dropping of flame sources (dripping) upon combustion, the method has a drawback in that the mechanical properties and the heat resistance of the resin composition tend to be low, and the method also has a problem in that toxic gases are produced due to decomposition of halogen compounds upon molding and upon combustion. From the viewpoint of recent environmental problems, non-halogen resins containing neither chlorine flame retardant nor bromine flame retardant are demanded.

Examples of non-halogen flame retardants include phosphorus flame retardants, and representative examples of phosphorus flame retardants which have been conventionally commonly employed include phosphoric acid esters. Examples of the methods disclosed so far include a method wherein polyphosphate is added to a styrene resin (Patent Document 1), method wherein a phosphoric acid ester having a specific structure is added to a rubber reinforced styrene resin (Patent Document 2), and a method wherein a liquid phosphoric acid ester is added to a styrene resin (Patent Document 3). However, since styrene resins are extremely flammable resins, the flame retardancy effects of phosphoric acid esters are low, and, in compositions obtained by the methods described in Patent Documents 1 to 3, blending of a large amount of a phosphoric acid ester is necessary to give flame retardancy to a styrene resin. This leads not only to decreased mechanical properties but also to bleeding out of the phosphoric ester, occurrence of mold fouling upon molding, and generation of gas upon molding, which are problematic.

On the other hand, as a method for solving the above problems, a method using a hydroxyl-containing phosphoric acid ester is disclosed in Patent Document 4. However, since hydroxyl-containing phosphoric acid esters also have low flame retardancy effects, the above problems could be hardly solved. Patent Document 5 discloses a method wherein a novolac phenol resin as a carbonized layer-forming polymer and a compound having a triazine skeleton are added to a hydroxyl-containing phosphoric acid ester for further improving the flame retardancy. This technique also failed to solve the problem of deteriorating the original mechanical properties, impact resistance and moldability of the styrene resin. Further, since phenol resins are materials having extremely low light resistance, the light resistance of the obtained resin composition decreases, which is also problematic.

Further, Patent Document 6 discloses a method wherein red phosphorus having a high flame retardancy effect is used as a non-halogen flame retardant, and a phenol resin having carbonized layer-forming capacity is added as a flame retardant aid. Although this technique can give flame retardancy, the original mechanical properties, impact resistance and moldability of the styrene resin are deteriorated. The method also has a problem in that red phosphorus makes the molded product colored with the color of red phosphorus.

Further, in Patent Document 7, it was discovered that, by blending a specific phosphoric acid ester compound and a specific phosphorous acid ester compound as flame retardants at specific ratios in a styrene resin, a flame-retardant resin composition having high flame retardancy as well as excellent mechanical strength, impact resistance and moldability can be obtained. However, the flame retardancy was not sufficient in some cases.

On the other hand, although there have been cases where an aromatic carbonate oligomer was added for improvement of the external appearance of a polycarbonate resin composition filled with a filler such as a glass fiber (Patent Document 8) or for improvement of the fluidity of a polycarbonate resin composition (Patent Document 9), the fact that addition of an aromatic carbonate oligomer to a styrene thermoplastic resin composition contributes to improvement of the flame retardancy of the resin composition has not been discovered.

PATENT DOCUMENTS

[Patent Document 1] JP 59-24736 A
[Patent Document 2] JP 11-140270 A
[Patent Document 3] JP 11-5869 A
[Patent Document 4] JP 5-247315 A
[Patent Document 5] JP 7-70448 A
[Patent Document 6] JP 6-157866 A
[Patent Document 7] JP 2001-49064 A
[Patent Document 8] JP 60-4550 A
[Patent Document 9] JP 2008-143997 A

SUMMARY OF THE INVENTION

The present invention aims to solve the above drawbacks of the prior art, thereby providing a flame-retardant styrene thermoplastic resin composition having excellent flame retardancy, mechanical properties and moldability, and a molded product thereof.

The present inventors intensively studied in order to solve the above problems, to discover that the above problems can be solved by blending a phosphoric acid ester flame retardant and a specific aromatic carbonate oligomer in a styrene resin.

That is, the present invention provides the flame-retardant styrene thermoplastic resin composition and the molded product thereof described in (1) to (9) below.

(1) A flame-retardant styrene thermoplastic resin composition comprising 6 to 15 parts by weight of a phosphoric acid ester flame retardant (II) and 0.1 to 3 parts by weight of an aromatic carbonate oligomer (III) having a viscosity average molecular weight [Mv] of 1,000 to 10,000 with respect to 100 parts by weight of a styrene resin (I).

(2) The flame-retardant styrene thermoplastic resin composition according to (1), wherein the phosphoric acid ester flame retardant (II) is represented by the General Formula 1 below:

[Chemical Formula 1]

General Formula 1

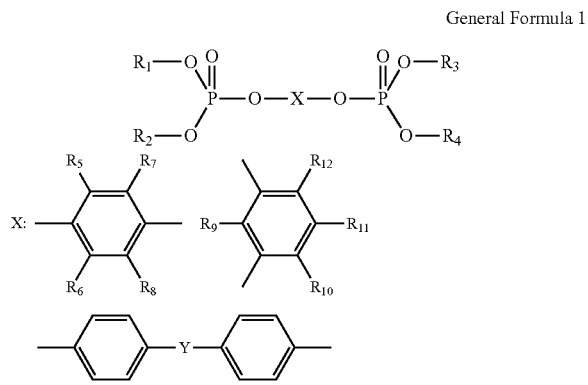

(wherein in General Formula 1, each of $R_1$ to $R_4$ represents phenyl, or phenyl substituted with an organic residue(s) having no halogen, and $R_1$ to $R_4$ may be the same with or different from one another; each of $R_5$ to $R_{12}$ represents a hydrogen atom or $C_{1-5}$ alkyl, and $R_5$ to $R_{12}$ may be the same with or different from one another; Y represents any one of a direct bond, O, S, $SO_2$, $C(CH_3)_2$, $CH_2$ and CHPh; and Ph represents phenyl).

(3) The flame-retardant styrene thermoplastic resin composition according to (1) or (2), wherein the aromatic carbonate oligomer (III) is represented by the General Formula 2 below:

[Chemical Formula 2]

General Formula 2

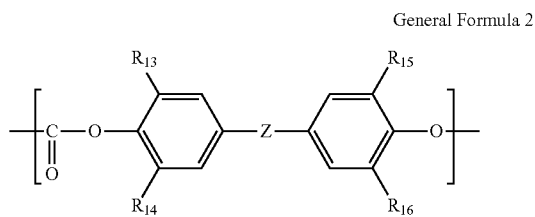

(wherein in General Formula 2, Z represents $C_{2-5}$ substituted or unsubstituted alkylidene, cyclohexylidene, oxygen atom, sulfur atom or sulfonyl; and each of $R_{13}$ to $R_{16}$ represents a hydrogen atom or $C_{1-3}$ alkyl, and $R_{13}$ to $R_{16}$ may be the same with or different from one another).

(4) The flame-retardant styrene thermoplastic resin composition according to any one of (1) to (3), wherein the styrene resin (I) is a composition comprising:

a graft copolymer (A) prepared by graft-copolymerizing a rubber polymer (a) with one or more monomers selected from aromatic vinyl monomers (b), vinyl cyanide monomers (c), unsaturated carboxylic acid alkyl ester monomers (d) and other copolymerizable vinyl monomers (e); and a vinyl (co)polymer (B) composed of one or more monomers selected from aromatic vinyl monomers (b), vinyl cyanide monomers (c), unsaturated carboxylic acid alkyl ester monomers (d) and other copolymerizable vinyl monomers (e); at a weight ratio of 10:90 to 50:50.

(5) The flame-retardant styrene thermoplastic resin composition according to any one of (1) to (4), wherein the phosphoric acid ester flame retardant (II) is resorcinol bis(dixylyl phosphate) (f) and/or resorcinol bis(diphenyl phosphate) (g).

(6) The flame-retardant styrene thermoplastic resin composition according to any one of (1) to (5), further comprising 0.1 to 1 part by weight of a phosphorus organic compound antioxidant (IV).

(7) The flame-retardant styrene thermoplastic resin composition according to any one of (1) to (6), further comprising 0.1 to 1 part by weight of a silicone compound (V).

(8) A molded product prepared by molding the flame-retardant styrene thermoplastic resin composition according to any one of (1) to (7).

(9) The molded product according to (8), whose flame retardancy satisfies the UL94 V-2 standard.

By the present invention, a flame-retardant styrene thermoplastic resin composition having excellent flame retardancy, mechanical properties and moldability, and a molded product thereof can be obtained.

DETAILED DESCRIPTION OF EMBODIMENTS OF THE INVENTION

Modes for carrying out the present invention are concretely described below.

The styrene resin (I) in the present invention means a vinyl (co)polymer (B) composed of one or more monomers selected from aromatic vinyl monomers (b), vinyl cyanide monomers (c), unsaturated carboxylic acid alkyl ester monomers (d) and other copolymerizable vinyl monomers (e); or a product produced by addition of a rubber polymer (a) to a vinyl (co)polymer (B).

In cases where the styrene resin (I) is produced by addition of a rubber polymer (a) to a vinyl (co)polymer (B), the composition preferably comprises:

a graft copolymer (A) prepared by graft-copolymerizing a rubber polymer, (a) with one or more monomers selected from aromatic vinyl monomers (b), vinyl cyanide monomers (c), unsaturated carboxylic acid alkyl ester monomers (d) and other copolymerizable vinyl monomers (e); and a vinyl (co)polymer (B) composed of one or more monomers selected from aromatic vinyl monomers (b), vinyl cyanide monomers (c), unsaturated carboxylic acid alkyl ester monomers (d) and other copolymerizable vinyl monomers (e); from the viewpoint of the compatibility between the vinyl (co)polymer (B) and the rubber polymer (a). It should be noted that the monomer mixture blended in the graft copolymer (A) does not need to be entirely grafted by linking to the rubber polymer (a), and monomers in the monomer mixture may be bound to each other to produce ungrafted polymers contained in the graft copolymer (A). The graft ratio is preferably 10 to 100%, more preferably 20 to 50%.

The mixing ratio between the graft copolymer (A) and the vinyl (co)polymer (B) is preferably 10:90 to 50:50, more preferably 20:80 to 40:60 in terms of the weight ratio of (A):(B). In cases where the ratio of the graft copolymer (A) is less than the above-described range, or in cases where the ratio of the vinyl (co)polymer (B) exceeds the above-described range, the impact strength tends to be low. In cases where the ratio of the graft copolymer (A) exceeds the above-described range, the flame retardancy and the fluidity tend to be low.

The reduced viscosity ($\eta_{sp}/c$) of the acetone-soluble matter of the graft copolymer (A) is not restricted, and is preferably 0.1 to 0.6 dl/g. Otherwise, the impact resistance is low, or the melt viscosity is high, so that the moldability is likely to be low. The reduced viscosity is more preferably 0.3 to 0.5 dl/g.

The reduced viscosity ($\eta_{sp}/c$) of the vinyl (co)polymer (B) is not restricted, and is preferably 0.1 to 0.6 dl/g. Otherwise, the impact resistance is low, or the melt viscosity is high, so that the moldability is likely to be low. The reduced viscosity is more preferably 0.3 to 0.5 dl/g.

The rubber polymer (a) is not restricted, and examples of the rubber polymer (a) which may be used include diene rubber, acrylic rubber and ethylene rubber. Specific examples of the rubber polymer (a) include polybutadiene, poly(butadiene-styrene), poly(butadiene-acrylonitrile), polyisoprene, poly(butadiene-butyl acrylate), poly(butadiene-methyl methacrylate), poly(butyl acrylate-methyl methacrylate), poly(butadiene-ethyl acrylate), ethylene-propylene rubber, ethylene-propylene-diene rubber, poly(ethylene-isoprene) and poly(ethylene-methyl acrylate). These rubber polymers (a) are used either individually or as a mixture of two or more thereof. Among these rubber polymers (a), polybutadiene, poly(butadiene-styrene), poly(butadiene-acrylonitrile) and ethylene-propylene rubber are preferably used in view of the impact resistance.

The weight average particle diameter of the rubber polymer (a) is not restricted, and is preferably 0.1 to 0.5 μm in view of the balance between the mechanical strength such as the impact resistance, and the external appearance of the molded product. In cases where the weight average particle diameter is less than 0.1 μm, the impact strength of the obtained thermoplastic composition may be low, while in cases where the weight average particle diameter is more than 0.5 μm, the external appearance of the molded product may often be deteriorated. The weight average particle diameter is more preferably 0.15 to 0.4 μm.

The aromatic vinyl monomer (b) to be used for the graft copolymer (A) and the vinyl (co)polymer (B) is not restricted, and specific examples thereof include styrene, α-methylstyrene, orthomethylstyrene, paramethylstyrene, para-t-butylstyrene and halogenated styrene. Either one or more of these may be used. Among these, styrene and α-methylstyrene are preferred, and styrene is especially preferred.

The vinyl cyanide monomer (c) to be used for the graft copolymer (A) and the vinyl (co)polymer (B) is not restricted, and specific examples thereof include acrylonitrile and methacrylonitrile. Either one or more of these may be used. Among these, acrylonitrile is preferred in view of the impact resistance.

The unsaturated carboxylic acid alkyl ester monomer (d) to be used for the graft copolymer (A) and the vinyl (co)polymer (B) is not restricted, and is preferably an acrylic acid ester and/or a methacrylic acid ester having $C_{1-6}$ alkyl or substituted alkyl. Either one or more of these may be used. Specific examples thereof include methyl(meth)acrylate, ethyl(meth)acrylate, n-propyl(meth)acrylate, n-butyl(meth)acrylate, t-butyl(meth)acrylate, n-hexyl(meth)acrylate, cyclohexyl(meth)acrylate, chloromethyl(meth)acrylate and 2-chloroethyl(meth)acrylate. Among these, methyl methacrylate is preferred.

The another copolymerizable vinyl monomer (e) to be used for the graft copolymer (A) and the vinyl (co)polymer (B) is not restricted, and specific examples thereof include copolymerizable vinyl compounds such as maleimide compounds including N-methylmaleimide, N-cyclohexylmaleimide and N-phenylmaleimide; unsaturated dicarboxylic acid including maleic acid; unsaturated dicarboxylic acid anhydride including maleic anhydride; and unsaturated amide compounds including acrylamide. Either one or more of these may be used. A plurality of types of the vinyl (co)polymer (B) may be used.

The methods for producing the graft copolymer (A) and the vinyl (co)polymer (B) are not restricted, and any of bulk polymerization, solution polymerization, suspension polymerization and emulsion polymerization may be used. The method for feeding monomers is also not restricted, and may be any of: feeding at once in the beginning; continuous feeding of a part or all of the monomers; or stepwise feeding of a part or all of the monomers.

Specific examples of the styrene resin (I) to be used in the present invention include polystyrene resins, high-impact polystyrene (HIPS) resins, AS resins, AAS resins, AES resins, ABS resins, MAS resins, MABS resins and MBA resins and alloys of these resins with other resins.

The phosphoric acid ester flame retardant (II) used in embodiments of the present invention is a phosphoric acid ester such as trimethyl phosphate, triethyl phosphate, tributyl phosphate, trioctyl phosphate, tributoxy ethyl phosphate, triphenyl phosphate, tricresyl phosphate, octyl diphenyl phosphate or the like, and is preferably a non-halogen phosphoric acid ester.

The phosphoric acid ester flame retardant (II) is more preferably one represented by the General Formula 1 below:

[Chemical Formula 3]

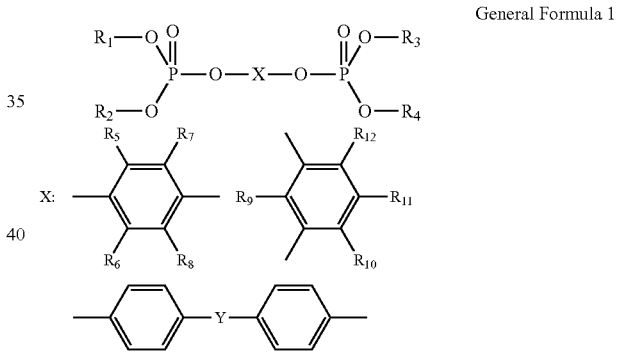

General Formula 1

(wherein in General Formula 1, each of $R_1$ to $R_4$ represents phenyl, or phenyl substituted with an organic residue(s) having no halogen, and $R_1$ to $R_4$ may be the same with or different from one another; each of $R_5$ to $R_{12}$ represents a hydrogen atom or $C_{1-5}$ alkyl, and $R_5$ to $R_{12}$ may be the same with or different from one another; Y represents any one of a direct bond, O, S, $SO_2$, $C(CH_3)_2$, $CH_2$ and CHPh; and Ph represents phenyl) in view of the flame retardancy efficiency.

In the phosphoric acid ester flame retardant (II) represented by the above General Formula 1, each of $R_1$ to $R_4$ represents either phenyl, or phenyl substituted with an organic residue(s) having no halogen, and $R_1$ to $R_4$ may be the same with or different from one another. Specific examples thereof include phenyl, tolyl, xylyl, cumenyl, mesityl, naphthyl, indenyl and anthryl. Phenyl, tolyl, xylyl, cumenyl and naphthyl, are preferred, and phenyl, tolyl and xylyl are especially preferred.

In the above General Formula 1, each of $R_5$ to $R_{12}$ represents hydrogen or $C_{1-5}$ alkyl, and $R_5$ to $R_{12}$ may be the same with or different from one another. Specific examples of the $C_{1-5}$ alkyl herein include methyl, ethyl, n-propyl, isopropyl, n-butyl, sec-butyl, tert-butyl, n-isopropyl, neopentyl, tertpentyl, 2-isopropyl, 3-isopropyl and neoisopropyl. Hydrogen, methyl and ethyl are preferred, and hydrogen is especially preferred.

Y represents any one of a direct bond, O, S, $SO_2$, $C(CH_3)_2$, $CH_2$ and CHPh, and Ph represents phenyl. Among these, $C(CH_3)_2$ is preferred.

Specific examples of the phosphoric acid ester flame retardant (II) represented by the above General Formula (1) include bisphenol A bisphosphate, bisphenol A bis(diphenyl phosphate), hydroquinone bisphosphate, resorcinol bis(dixylyl phosphate), resorcinol bisphosphate, resorcinol (diphenyl phosphate) and resorcinol bis(diphenyl phosphate), and substitution products and condensates thereof. Resorcinol bis(dixylyl phosphate), resorcinol bis(diphenyl phosphate) and the like are especially excellent in the balance between the rigidity and the flame retardancy, and preferably employed. These may be used either individually or as a combination of two or more of them.

The content of the phosphoric acid ester flame retardant (II) in the present invention is preferably 6 to 15 parts by weight, more preferably 8 to 12 parts by weight with respect to 100 parts by weight of the styrene resin (I). In cases where the content of the phosphoric acid ester flame retardant (II) is less than the above-described range, the flame retardancy is not sufficient, while in cases where the content of the phosphoric acid ester flame retardant (II) exceeds the above-described range, the mechanical properties and the heat resistance of the obtained thermoplastic resin are low and the amount of gas produced tends to be large.

The aromatic carbonate oligomer (III) used in the present invention means a low-molecular-weight aromatic carbonate oligomer having a viscosity average molecular weight [Mv] of 1,000 to 10,000. The viscosity average molecular weight [Mv] means a value obtained by determining the limiting viscosity [η] (unit: dl/g) with an Ubbelohde viscometer using chloromethane as a solvent at a temperature of 20° C., followed by calculation according to the Schnell's viscosity equation, that is, $[\eta]=1.23\times10^{-4}\times(Mv)^{0.83}$, The limiting viscosity [η] herein is a value obtained by measuring the specific viscosity $[\eta_{sp}]$ at each solution concentration [C] (g/dl), followed by calculation according to the equation below:

$$\eta=\lim \eta_{sp}/c(c\rightarrow 0).$$

The aromatic carbonate oligomer (III) is obtained by the reaction of an aromatic dihydroxy compound representatively exemplified by 2,2-bis(4-hydroxyphenyl)propane and 2,2-bis(3,5-dimethyl-4-hydroxyphenyl)propane with a carbonate precursor representatively exemplified by phosgene.

Examples of the aromatic dihydroxy compound include bis(hydroxyaryl)alkanes such as 2,2-bis(4-hydroxyphenyl)propane (which may be hereinafter referred to as bisphenol A), 1,1-bis(4-hydroxyphenyl)ethane, 2,2-bis(4-hydroxyphenyl)butane, 2,2-bis(4-hydroxyphenyl)octane, 2,2-bis(4-hydroxy-3-methylphenyl)propane, 1,1-bis(3-tert-butyl-4-hydroxyphenyl)propane, 2,2-bis(4-hydroxy-3,5-dimethylphenyl)propane, 2,2-bis(3-phenyl-4-hydroxyphenyl)propane, 2,2-bis(3-cyclohexyl-4-hydroxyphenyl)propane, 1,1-bis(4-hydroxyphenyl)-1-phenylethane and bis(4-hydroxyphenyl)diphenylmethane; bis(hydroxyaryl)cycloalkanes such as 1,1-bis(4-hydroxyphenyl)cyclopentane, 1,1-bis(4-hydroxyphenyl)cyclohexane and 1,1-bis(4-hydroxyphenyl)-3,3,5-trimethylcyclohexane; cardo structure-containing bisphenols such as 9,9-bis(4-hydroxyphenyl)fluorene and 9,9-bis(4-hydroxy-3-methylphenyl)fluorene; dihydroxydiaryl ethers such as 4,4'-dihydroxydiphenyl ether and 4,4'-dihydroxy-3,3'-dimethyldiphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; dihydroxydiaryl sulfones such as 4,4'-dihydroxydiphenyl sulfone and 4,4'-dihydroxy-3,3'-dimethyldiphenyl sulfone; hydroquinone; resorcin; and 4,4'-dihydroxydiphenyl.

Among these, bis(4-hydroxyaryl)alkanes are preferred, and bisphenol A is especially preferred. These aromatic dihydroxy compounds may be used either individually or as a combination of two or more of them.

Examples of the carbonate precursor to be reacted with the aromatic dihydroxy compound include carbonyl halides, carbonate esters and haloformates, and specific examples of the carbonate precursor include phosgene; diaryl carbonates such as diphenyl carbonate and ditolyl carbonate; dialkyl carbonates such as dimethyl carbonate and diethyl carbonate; and dihaloformates of bivalent phenols. Among these, phosgene is often preferably used. These carbonate precursors may also be used either individually or as a combination of two or more of them.

The method for producing the aromatic carbonate oligomer (III) used in the present invention is not restricted, and the aromatic carbonate oligomer (III) may be produced by a known conventional method. Specific examples of the method include interfacial polymerization (the phosgene method), melt transesterification, solution polymerization (the pyridine method), ring-opening polymerization of a cyclic carbonate compound and solid-phase transesterification of a prepolymer.

In the reaction by interfacial polymerization, an aromatic dihydroxy compound is reacted with phosgene in the presence of an organic solvent and an aqueous alkaline solution inert to the reaction while the pH is maintained at not less than 9, using, as required, a molecular weight modifier (terminator) and an antioxidant for antioxidation of the aromatic dihydroxy compound, followed by addition of a polymerization catalyst such as a tertiary amine or quaternary ammonium salt to perform interfacial polymerization, thereby obtaining a polycarbonate. The timing of addition of the molecular weight modifier is not restricted as long as it is between the phosgenation and the beginning of the polymerization reaction. The reaction temperature is, for example, 0 to 40° C., and the reaction time is, for example, several minutes (e.g., 10 minutes) to several hours (e.g., 6 hours).

The organic solvent which may be applied to the interfacial polymerization is not restricted as long as it is inert to the interfacial polymerization and is not mingled with water. Examples of the organic solvent include chlorinated hydrocarbons such as dichloromethane, 1,2-dichloroethane, chloroform, monochlorobenzene and dichlorobenzene; and aromatic hydrocarbons such as benzene, toluene and xylene. Examples of the alkaline compound used for the aqueous alkaline solution include hydroxides of alkali metals such as sodium hydroxide and potassium hydroxide.

Examples of the molecular weight modifier which may be applied to the interfacial polymerization include compounds having a monovalent phenolic hydroxyl group(s), and phenyl chloroformate. Examples of the compounds having a monovalent phenolic hydroxyl group(s) include m-methylphenol, p-methylphenol, m-propylphenol, p-propylphenol, p-tert-butylphenol and p-long chain alkyl-substituted phenol. The amount of molecular weight modifier to be used is preferably not less than 0.5 mole, more preferably not less than 1 mole with respect to 100 moles of the aromatic dihydroxy compound.

In cases where the production is performed by interfacial polymerization, examples of the polymerization catalyst include tertiary amines such as trimethylamine, triethylamine, tributylamine, tripropylamine, trihexylamine and pyridine; and quaternary ammonium salts such as trimethyl benzyl ammonium chloride, tetrabutyl ammonium chloride, tetramethyl ammonium chloride, triethyl benzyl ammonium chloride and trioctyl methyl ammonium chloride.

The reaction by melt transesterification is a transesterification reaction between a carbonic acid diester and an aromatic dihydroxy compound. Examples of the aromatic dihydroxy compound include those described above, and these aromatic dihydroxy compounds may be used either individually or as a mixture of two or more thereof. Among these, bisphenol A is preferred.

Examples of the carbonic acid diester include dialkyl carbonate compounds such as dimethyl carbonate, diethyl carbonate and di-tert-butyl carbonate; and substituted diphenyl carbonates such as diphenyl carbonate and ditolyl carbonate. The carbonic acid diester is preferably diphenyl carbonate, dimethyl carbonate or a substituted diphenyl carbonate, more preferably diphenyl carbonate or dimethyl carbonate, especially preferably diphenyl carbonate.

In general, by controlling the mixing ratio between the carbonic acid diester and the aromatic dihydroxy compound or by controlling the degree of reduction of the pressure during the reaction, a polycarbonate having a desired molecular weight and amount of terminal hydroxyl groups can be obtained. As a more positive method, a method wherein a terminator is separately added when the reaction is to be stopped is also well known. Examples of the terminator used in this case include monovalent phenols, monovalent carboxylic acids and carbonic acid diesters. The amount of terminal hydroxyl groups largely influences the thermal stability, hydrolytic stability and color tone of the product polycarbonate. Although the amount of terminal hydroxyl groups varies depending on the use, the amount is preferably not more than 1,000 ppm, more preferably not more than 700 ppm in view of giving practical physical properties.

In cases where the production is performed by transesterification, the amount of terminal hydroxyl groups is preferably not less than 100 ppm. By using such an amount of terminal hydroxyl groups, a decrease in the molecular weight can be suppressed, and a better color tone can be obtained. Thus, the carbonic acid diester is used preferably in an amount larger than the equimolar amount, more preferably in an amount of 1.01 to 1.30 moles, especially preferably in a molar ratio of 1.02 to 1.2 with respect to 1 mole of the aromatic dihydroxy compound.

In cases where the production is performed by transesterification, a transesterification catalyst is usually used. The transesterification catalyst is not restricted, and is preferably an alkali metal compound and/or alkaline earth metal compound. It is also possible to supplementarily use a basic compound such as a basic boron compound, basic phosphorus compound, basic ammonium compound or amine compound in combination. Examples of the method of transesterification using the above materials include a method wherein the reaction is allowed to proceed at a temperature of 100 to 320° C. and melt polycondensation is finally performed under a reduced pressure of not more than $2.6 \times 10^2$ Pa (2 mmHg) in terms of the absolute pressure, while side products such as aromatic hydroxy compounds and the like are removed.

The melt polycondensation may be carried out either in a batchwise manner or in a continuous manner, and, taking into account the stability of the aromatic carbonate oligomer (III) component and the like, the melt polycondensation is preferably carried out in a continuous manner. As an inactivator of the catalyst in the transesterification polycarbonate, a compound that neutralizes the catalyst, such as a sulfur-containing acidic compound or a derivative formed therefrom is preferably used. Such a compound that neutralizes the catalyst is added in an amount within the range of preferably 0.5 to 10 equivalents, more, preferably 1 to 5 equivalents with respect to the alkali metal contained in the catalyst. Further, such a compound that neutralizes the catalyst is added in an amount within the range of preferably 1 to 100 ppm, more preferably 1 to 20 ppm with respect to the polycarbonate.

The molecular weight of the aromatic carbonate oligomer (III) used in the present invention is preferably within the range of 1,000 to 10,000 in terms of the viscosity average molecular weight [Mv] calculated based on the limiting viscosity [η]. In cases where the viscosity average molecular weight [Mv] is less than 1,000, there is a risk of bleeding out from the molded product during molding, and the impact resistance is low. On the other hand, in cases where the viscosity average molecular weight is more than 10,000, the flame retardancy is low, and stable achievement of flame retardancy satisfying UL94 V-2 is impossible. Taking the balance between these into account, the viscosity average molecular weight [Mv] is preferably 1,500 to 9,000, more preferably 2,000 to 8,000. The above-described viscosity average molecular weight [Mv] may also be achieved by mixing two or more types of aromatic carbonate oligomers having different viscosity average molecular weights. In such cases, an aromatic carbonate oligomer whose viscosity average molecular weight is not included in the above-described preferred range may also be used for the mixing.

The aromatic carbonate oligomer (III) used in the present invention is not restricted as long as it is obtained by the above-described method, and, preferably, the aromatic carbonate oligomer (III) has a repetitive structure unit represented by General Formula 2 and a viscosity average molecular weight [Mv] of 1,000 to 10,000.

[Chemical Formula 4]

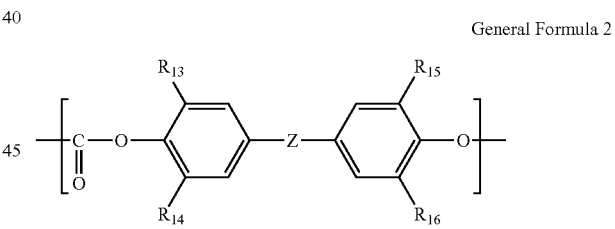

General Formula 2

(wherein in General Formula 2, Z represents $C_{2-5}$ substituted or unsubstituted alkylidene, cyclohexylidene, oxygen atom, sulfur atom or sulfonyl; and each of $R_{13}$ to $R_{16}$ represents a hydrogen atom or $C_{1-6}$ alkyl, and $R_{13}$ to $R_{16}$ may be the same with or different from one another).

The amount of the aromatic carbonate oligomer (III) used in embodiments of the present invention to be added is 0.1 to 3 parts by weight, preferably 0.2 to 2.5 parts by weight, more preferably 0.3 to 2 parts by weight with respect to 100 parts by weight of the styrene resin (I). In cases where the amount of the aromatic carbonate oligomer (III) added is less than the above-described range, the flame retardancy is not sufficient, while in cases where the amount of the aromatic carbonate oligomer (III) added is more than the above-described range, the mechanical strength and the thermal stability of the obtained thermoplastic resin composition are low and the amount of gas produced tends to be large, which is not preferred.

To the flame-retardant styrene thermoplastic resin composition of the present invention, an antioxidant is preferably added in view of prevention of deterioration upon melting. The antioxidant is preferably a phosphorus organic compound antioxidant (IV) since its addition does not adversely affect the flame retardancy. Examples of the phosphorus organic compound antioxidant (IV) to be used include trisnonylphenyl phosphite, tris(2,4-di-t-butylphenyl)phosphite, distearyl pentaerythritol diphosphite, bis(2,4-di-t-butylphenyl)pentaerythritol phosphite, bis(2,6-di-t-butyl-4-methylphenyl)pentaerythritol phosphite, 2,2-methylenebis(4,6-di-t-butylphenyl)octylphosphite and tetrakis(4,6-di-t-butylphenyl)-4,4-biphenylene-di-phosphonite, and, among these, distearyl pentaerythritol diphosphite is preferably used.

The content of the phosphorus organic compound antioxidant (IV) in the present invention is preferably 0.1 to 1 part by weight, more preferably 0.3 to 0.8 part by weight with respect to 100 parts by weight of the styrene resin (I). In cases where the content is less than the above-described range, the effect of preventing deterioration upon melting is not sufficient, while in cases where the content is more than the above-described range, the amount of gas produced upon molding of the thermoplastic resin composition is large, which is not preferred.

In the flame-retardant styrene thermoplastic resin composition of the present invention, a silicone compound (V) is preferably added in view of increasing the flame retardancy. Examples of the silicone compound (V) include silicone powders, silicone rubbers, silicone oils and silicone resins, and derivatives thereof having improved compatibility and/or reactivity. The silicone compound (V) may further contain a silica filler, and the method of mixing the silica filler may be a conventional known method.

The content of the silicone compound (V) in the present invention is preferably 0.1 to 1 part by weight, more preferably 0.3 to 0.8 part by weight with respect to 100 parts by weight of the styrene resin. In cases where the content is less than the above-described range, the effect of increasing the flame retardancy is not sufficient, while in cases where the content is more than the above-described range, the fluidity and mechanical properties may decrease, which is not preferred.

The method for producing the flame-retardant styrene thermoplastic resin composition of the present invention is not restricted, and the composition may be one prepared by pre-mixing (I) to (V) by, for example, using a mixer such as a V-type blender, super mixer, super floater or Henschel mixer. Usually, in many cases, the composition is a mixture prepared by uniformly melt-mixing the above-described premixture. Such a mixture can be obtained by subjecting the premixture to a kneading method wherein, for example, the premixture is melt-kneaded at a temperature of preferably about 200 to 280° C., more preferably about 220 to 260° C., followed by pelletization. Specific examples of the means of melt kneading and pelletization include a method wherein the resin composition is melted and extruded using various melt mixers such as a kneader, uniaxial extruder or biaxial extruder, followed by pelletization using a pelletizer.

Additionally, the flame-retardant styrene thermoplastic resin composition of the present invention may contain, within the range in which the object of the present invention is not deteriorated, polyvinyl chloride resins; polyolefin resins such as polyethylene and polypropylene; polyamide resins such as nylon 6 and nylon 66; polyester resins such as aliphatic polyesters (e.g., polylactic acid), polyethylene terephthalate, polybutylene terephthalate and polycyclohexane dimethyl terephthalate; polycarbonate resins; fluorocarbon resins such as polytetrafluoroethylene; various elastomers; and the like; for further improving the performance as a resin composition for molding. In cases where these components are blended such that the object of the present invention is not deteriorated, that is, such that the flame retardancy and the mechanical strength do not decrease, the range of their content is preferably not more than 10 parts by weight with respect to 100 parts by weight of the styrene resin (I), although the range may vary depending on the component to be blended.

Further, the flame-retardant styrene thermoplastic resin composition of the present invention may additionally contain, as required, one or more of normal additives such as inorganic fillers including glass fibers, glass powders, glass beads, glass flakes, alumina, alumina fibers, carbon fibers, graphite fibers, stainless steel fibers, whisker, potassium titanate fiber, wollastonite, asbestos, hard clay, calcined clay, talc, kaolin, mica, calcium carbonate, magnesium carbonate, aluminum oxide and minerals; hindered phenol-type, benzotriazole-type, benzophenone-type, benzoate-type and cyanoacrylate-type ultraviolet absorbers/lubricants; lubricants and plasticizers including those of higher fatty acid- or acid ester-type, acid amide-type, and higher alcohol; mold release agents including montanic acid, salts thereof, esters thereof, half esters thereof, stearyl alcohol, stearamide and ethylene waxes; coloring inhibitors such as phosphites and hypophosphites; neutralizers including maleic anhydride and succinic anhydride; nucleating agents; antistatic agents including those of the amine type, sulfonic acid type and polyether type; and coloring agents including carbon black, pigments and dyes.

The flame-retardant styrene thermoplastic resin composition of the present invention obtained as described above can be molded by a known method currently used for molding a thermoplastic resin, such as injection molding, extrusion molding, blow molding, vacuum molding, compression molding or gas-assist molding. The method of molding per se is not restricted.

EXAMPLES

The present invention will now be described in detail by way of Examples and Comparative Examples, but the present invention is not limited by these.

(1) Weight Average Rubber Particle Diameter

The weight average rubber particle diameter was determined by the sodium alginate method described in "Rubber Age Vol. 88 pp. 484-490 (1960) by E. Schmidt, P. H. Biddison". That is, based on the fact that the polybutadiene particle diameter upon creaming varies depending on the concentration of sodium alginate, the particle diameter at a cumulative weight ratio of 50% was determined from the weight ratio of the creamed portion and the cumulative weight ratio of sodium alginate.

(2) Graft Ratio

Acetone was added to a predetermined amount (m) of a graft copolymer, and refluxed for 3 hours. The resulting solution was centrifuged at 8800 r/min. (10000 G) for 40 minutes, and the insoluble matter was collected by filtration. The collected insoluble matter was then dried at 60° C. for 5 hours under reduced pressure, and the weight (n) was measured. The graft ratio was calculated according to the equation below.

$$\text{Graft ratio (\%)} = \{[(n)-(m) \times L]/[(m) \times L]\} \times 100$$

(wherein L represents the content of rubber in the graft copolymer).

(3) Reduced Viscosity [$\eta_{sp}/c$]

To 1 g of the sample, 200 ml of acetone was added, and the resulting mixture was refluxed for 3 hours. The resulting solution was centrifuged at 8800 r/min. (10000 G) for 40 minutes, and the insoluble matter was removed by filtration. The filtrate was concentrated with a rotary evaporator, and the precipitate (acetone-soluble matter) was dried at 60° C. for 5 hours under reduced pressure, followed by adjusting the concentration to 0.4 g/100 ml (methyl ethyl ketone, 30° C.) and measuring [$\eta_{sp}/c$] using an Ubbelohde viscometer.

(4) Limiting Viscosity [$\eta$]

In 100 cm$^3$ of dichloromethane, 1 g of the sample was uniformly dissolved, and the specific viscosity [$\eta_{sp}$] was measured using an Ubbelohde viscometer. Further, the concentration was changed and the specific viscosity was similarly measured. The concentration [c] and [$\eta_{sp}/c$] were plotted to prepare a graph, which was then extrapolated to the zero side, to determine the limiting viscosity [$\eta$]. That is, the limiting viscosity was calculated according to $\eta = \lim \eta_{sp}/c$ (c→0).

(5) Flame Retardancy [UL94 V-2]

Test pieces for evaluation of the flame retardancy having a thickness of 0.75 mm or 3 mm were obtained by injection molding, and subjected to evaluation of the flame retardancy according to the evaluation standard specified by UL94. The flammability test piece was vertically placed, and the center of the lower end of the flammability test piece was contacted with blue flame having a length of 20 mm for 10 seconds, followed by separating the flame from the test piece and measuring the burning time. After disappearance of the first flame, the test piece was contacted again with flame for 10 seconds, and the burning time and the glow extinction time were measured. The assessment results were as follows.

[V-2]:

The test piece did not burn for 30 seconds or longer after each of the first and second contact with flame, and the glow extinction time after the second contact with flame was not more than 60 seconds. Gauze placed 30 cm below may catch fire. The measurement was carried out for n=5. Further, the total time of burning with flame for the 5 flammability test pieces was not more than 250 seconds.

[V-2NG]:

The test piece burned for more than 30 seconds after each of the first and second contact with flame, or the glow extinction time after the second contact with flame was not less than 60 seconds. The measurement was carried out for n=5. Further, in cases where the total time of burning with flame for the 5 flammability test pieces was more than 250 seconds, the test pieces were judged to be NG.

(6) Melt Flow Rate

Pellets of the thermoplastic resin composition were dried at 80° C. in a hot-air drier for 3 hours, and subjected to measurement according to ISO-1133 (2005) under the conditions of 220° C. and 98 N.

(7) Deflection Temperature Under Load

Measurement was carried out according to ISO 75 (2004) under the conditions of a thickness of the test piece of 4.0 mm and 1.8 MPa.

(8) Charpy Impact Strength

Measurement was carried out according to ISO 179 (2000) under the conditions of: V-notched (remaining width, 8.0 mm), 23° C. and 50% RH.

(9) Volatile Matter

Pellets of the thermoplastic resin composition were predried at 80° C. in a hot-air drier for 3 hours, and 3 g of the predried pellets were subjected to heat treatment for 3 hours in a gear oven set to 180° C. The pellets were then stabilized by storing for 30 minutes in a desiccator in a room where the temperature was controlled to 23° C., and weighed to calculate the ratio of decrease in the weight after the heat treatment. The measurement was carried out for n=3, and the mean value was regarded as the value for the volatile matter.

Reference Example 1

Method for Producing Graft Copolymer (A)

Graft Copolymer (A)-1

To a nitrogen-substituted reactor, 120 parts by weight of pure water, 0.5 part by weight of glucose, 0.5 part by weight of sodium pyrophosphate, 0.005 part by weight of ferrous sulfate and 60 parts by weight (in terms of the solid content) of polybutadiene latex (weight average rubber particle diameter, 0.3 μm; gel content, 85%) were fed, and the temperature in the reactor was increased to 65° C. while the resulting mixture was stirred. When the inner temperature reached 65° C., polymerization was initiated by dropwise addition of a mixture composed of monomers (30 parts by weight of styrene and 10 parts by weight of acrylonitrile) and 0.3 part by weight of t-dodecyl mercaptan, which addition was continued for 5 hours. At the same time, the aqueous solution composed of 0.25 part by weight of cumene hydroperoxide, 2.5 parts by weight of potassium oleate and 25 parts by weight of pure water was continuously added dropwise thereto for 7 hours, and the reaction was then completed. The obtained styrene copolymer latex was coagulated with sulfuric acid and then neutralized with caustic soda, followed by washing, filtration and drying of the resulting product, to obtain a graft copolymer (A). In this styrene graft copolymer (A), the graft ratio was 35%, and the reduced viscosity ($\eta_{sp}/c$) of the acetone-soluble matter was 0.35 dl/g.

Graft Copolymer (A)-2

To a reactor, 50 parts by weight (in terms of the solid content) of polybutadiene latex (weight average rubber particle diameter, 0.3 μm; gel content, 85%), 200 parts by weight of pure water, 0.4 part by weight of sodium formaldehyde sulfoxylate, 0.1 part by weight of sodium ethylenediaminetetraacetic acid, 0.01 part by weight of ferrous sulfate and 0.1 part by weight of sodium phosphate were fed, and the atmosphere was replaced with nitrogen, followed by adjusting the temperature to 65° C. With stirring, the monomer mixture composed of 11.5 parts by weight of styrene, 4.0 parts by weight of acrylonitrile, 34.5 parts by weight of methyl methacrylate and 0.3 part by weight of n-dodecyl mercaptan was continuously added dropwise thereto for 4 hours. At the same time, the mixture of 0.25 part by weight of cumene hydroperoxide, 2.5 parts by weight of sodium laurate as an emulsifier and 25 parts by weight of pure water was continuously added dropwise thereto for 5 hours. After completion of the dropwise addition, the reaction mixture was left to stand for 1 hour, and the polymerization was then finished. The latex after polymerization was coagulated with 1.5% sulfuric acid and then neutralized with sodium hydroxide, followed by washing, centrifugation and drying of the resulting product, to obtain a graft copolymer in a powder form. In the obtained graft copolymer (A), the graft ratio of the graft component was 45%.

Reference Example 2

Method for Producing Vinyl (Co)Polymer (B)

Vinyl (Co)Polymer (B)-1

Using a continuous bulk polymerization apparatus composed of: a 2-m$^3$ complete-mixing polymerization tank equipped with an evaporation/reflux condenser for the monomer vapor and a helical ribbon wing; a uniaxial-extruder-type preheater; and a biaxial-extruder-type feeder equipped with a biaxial-extruder-type demonomerization apparatus and a heater tandemly connected to the barrel portion positioned at a distance of ⅓ from the end of the demonomerization apparatus; copolymerization and mixing of resin components were carried out as follows.

First, while the monomer mixture composed of 70.0 parts by weight of styrene, 30.0 parts by weight of acrylonitrile, 0.15 part by weight of n-octyl mercaptan and 0.01 part by weight of 1,1-di(t-butylperoxy)cyclohexane was continuously supplied to the polymerization tank at 150 kg/hour, continuous bulk polymerization was allowed to proceed at a constant polymerization temperature of 130° C. and a constant inner tank pressure of 0.08 MPa. The rate of polymerization in the polymerization reaction mixture in the polymerization tank was controlled between 74% and 76%. From the obtained polymerization reaction product, unreacted monomers were recovered from the vent port of the biaxial-extruder-type demonomerization apparatus by distillation under reduced pressure, to adjust the apparent rate of polymerization to not less than 99%. The product was then discharged into a strand-like shape and pelletized using a cutter, to obtain a vinyl (co)polymer (B)-1. The reduced viscosity ($\eta_{sp}/c$) of the vinyl (co)polymer (B)-1 was 0.53 dl/g.

Vinyl (Co)Polymer (B)-2

The monomer mixture composed of 70.0 parts by weight of styrene, 30.0 parts by weight of acrylonitrile, 0.2 part by weight of n-octyl mercaptan and 0.01 part by weight of 1,1-di(t-butylperoxy)cyclohexane was subjected to polymerization in the same manner as in the case of the vinyl (co)polymer (B)-1, to obtain a vinyl (co)polymer (B)-2. The reduced viscosity ($\eta_{sp}/c$) of the vinyl (co)polymer (B)-2 was 0.43 dl/g.

Vinyl (Co)Polymer (B)-3

In a 20-L autoclave, a solution prepared by dissolving 0.05 part by weight of a methyl methacrylate/acrylamide copolymer (described in JP 45-24151 B) in 165 parts by weight of pure water was placed, and the solution was stirred at 400 rpm, and the atmosphere in the system was replaced with nitrogen gas. Subsequently, the mixed solution of 5.0 parts by weight of acrylonitrile, 25 parts by weight of styrene, 70 parts by weight of methyl methacrylate, 0.4 part by weight of azobisisobutyronitrile and 0.30 part by weight of t-dodecyl mercaptan was added thereto while the reaction system was stirred, and copolymerization reaction was initiated at 60° C. The temperature was further increased for 15 minutes to 65° C., and then for 50 minutes to 100° C. After the temperature reached 100° C., the temperature was kept for 30 minutes, and the reaction solution was cooled, followed by separation, washing and drying of the polymer, to obtain a vinyl (co)polymer (B)-3 in the form of beads. The reduced viscosity $\eta_{sp}/c$ of the vinyl (co)polymer (B)-3 was 0.32 dl/g.

Reference Example 3

Phosphoric Acid Ester Flame Retardant (II)

Phosphoric Acid Ester Flame Retardant (II)-1
Resorcinol bis(dixylyl phosphate) (trade name, PX200; manufactured by Daihachi Chemical Industry Co., Ltd.; phosphorus content, 9.0%) was provided.

Phosphoric Acid Ester Flame Retardant (II)-2
Resorcinol bis(diphenyl phosphate) (trade name, CR733S; manufactured by Daihachi Chemical Industry Co., Ltd.; phosphorus content, 10.5%) was provided.

Reference Example 4

Aromatic Carbonate Oligomer (III)

In 42.1 L of 8 wt % aqueous sodium hydroxide solution, 5.472 kg (24 mol) of bisphenol A, 6.0 g of hydrosulfide and 1.028 kg of p-tert-butylphenol were dissolved, to prepare Solution A. Further, while 24.0 L of dichloromethane was stirred at a constant temperature of 15° C., 3.0 kg of phosgene was passed therethrough for 50 minutes, to prepare Solution B. Thereafter, while Solution A was stirred, Solution B was added to Solution A to allow the reaction to proceed. Thereafter, 12.0 mL of triethylamine was added to the reaction mixture, and the resulting mixture was stirred at 20 to 25° C. for about 1 hour to allow polymerization. After completion of the polymerization, the reaction liquid was separated into the aqueous phase and the organic phase, and the organic phase was neutralized with phosphoric acid, followed by repeating washing with water until the electric conductivity of the washing liquid (aqueous phase) became not more than 10 µS/cm. The obtained polymer solution was added dropwise to hot water at a constant temperature of 45° C., and the solvent was then removed by evaporation, to obtain a white powder precipitate. The precipitate was filtered, and dried at 110° C. for 24 hours, to obtain an aromatic carbonate oligomer (III).

The limiting viscosity [η] at 20° C. was 0.19 dl/g. It is known that the relationship between the limiting viscosity [η] and the viscosity average molecular weight [Mv] satisfies the Schnell's viscosity equation: $[\eta]=1.23\times10^{-4}\times(Mv)^{0.83}$, and, as a result of conversion from the value of the limiting viscosity [η], [Mv] was confirmed to be 6,950. As a result of analysis of the infrared absorption spectrum, absorption by the carbonyl group was found at about 1770 cm$^{-1}$ and absorption by the ether bond was found at about 1240 cm$^{-1}$, so that the resin was confirmed to be a polycarbonate resin having the carbonate bond.

Reference Example 5

Aromatic Polycarbonate

TARFLON A1900 (bisphenol A polycarbonate resin manufactured by Idemitsu Kosan Co., Ltd.; viscosity average molecular weight [Mv], 19,000; terminal p-tert-butylphenoxy-modified) was provided.

Reference Example 6

Aliphatic Polyester Resin

Polylactic acid manufactured by Nature Works (poly-L-lactic acid having a weight average molecular weight of 200,000: L-lactic acid unit, 99%; D-lactic acid unit, 1%; melting point, 175° C.) was provided.

Reference Example 7

Phosphorus Organic Compound Antioxidant (IV)

Distearyl pentaerythritol diphosphite (trade name, "ADK STAB" PEP-8; manufactured by ADEKA Corporation) was provided.

Reference Example 8

Silicone Compound (V)

Silicone powder (trade name, DC4-7081; manufactured by Dow Corning Toray Co., Ltd.) was provided.

Examples 1 to 13

The graft copolymer (A), vinyl (co)polymer (B), phosphoric acid ester flame retardant (II), aromatic carbonate oligomer (III), aliphatic polyester resin, phosphorus organic compound antioxidant (IV) and silicone compound (V) described in Reference Examples were mixed together at the mixing ratios shown in Table 1, and each resulting mixture was melt-kneaded and extruded using a 40-mm uniaxial extruder equipped with a vent at a cylinder temperature of 230° C., to produce a flame-retardant thermoplastic resin composition in the form of pellets. The obtained pellets were predried at 80° C. in a hot-air drier for 3 hours, and the tensile test piece specified by IS0527 (1993) (total length, 150 mm; width of the test part, 10 mm; thickness, 4 mm) was molded using the electric injection molder SE50 manufactured by Sumitomo Heavy Industries, Ltd. at a cylinder temperature of 230° C. and a mold temperature of 60° C. All the compositions showed good moldability, and good products could be obtained. Each molded piece was processed to prepare a test piece for measurement of the deflection temperature under load and the Charpy impact strength. Physical properties of the products of Examples 1 to 13 were as shown in Table 1.

TABLE 1

| | Unit | Example 1 | Example 2 | Example 3 | Example 4 | Example 5 | Example 6 | Example 7 |
|---|---|---|---|---|---|---|---|---|
| Graft copolymer (A)-1 | Part by weight | 20 | 25 | 20 | 20 | | | 25 |
| Graft copolymer (A)-2 | | | | | | 25 | 25 | |
| Vinyl (co)polymer (B)-1 | | 40 | 37.5 | 40 | 40 | | | 70 |
| Vinyl (co)polymer (B)-2 | | 40 | 37.5 | 40 | 40 | | | |
| Vinyl (co)polymer (B)-3 | | | | | | 75 | 75 | |
| Phosphoric acid ester compound (II)-1 | | 10 | 10 | 10 | 8 | 12 | 10 | 14 |
| Phosphoric acid ester compound (II)-2 | | | | | 2 | | 2 | |
| Aromatic carbonate oligomer (III) | | 1 | 1 | 2 | 1 | 1 | 1 | 1 |
| Aliphatic polyester resin | | | | | | | | 5 |
| Phosphorus organic compound antioxidant (IV) | | | | | | | | |
| Silicone compound (V) | | | | | | | | |
| Flame retardancy (0.75 mm thickness) | — | V-2 | V-2 | V-2 | V-2 | V-2 | V-2 | V-2 |
| Flame retardancy (3 mm thickness) | — | V-2 | V-2 | V-2 | V-2 | V-2 | V-2 | V-2 |
| Melt flow rate | g/10 min | 48 | 40 | 51 | 50 | 36 | 39 | 35 |
| Deflection temperature under load | °C. | 76 | 75 | 75 | 76 | 67 | 66 | 73 |
| Charpy impact strength | kJ/m² | 7 | 12 | 6 | 7 | 6 | 5.5 | 7.5 |
| Volatile matter | wt % | 0.3 | 0.5 | 0.4 | 0.3 | 0.6 | 0.5 | 0.7 |

| | Unit | Example 8 | Example 9 | Example 10 | Example 11 | Example 12 | Example 13 |
|---|---|---|---|---|---|---|---|
| Graft copolymer (A)-1 | Part by weight | 25 | 20 | 20 | 20 | 20 | 25 |
| Graft copolymer (A)-2 | | | | | | | |
| Vinyl (co)polymer (B)-1 | | 70 | 40 | 40 | 40 | 40 | 37.5 |
| Vinyl (co)polymer (B)-2 | | | 40 | 40 | 40 | 40 | 37.5 |
| Vinyl (co)polymer (B)-3 | | | | | | | |
| Phosphoric acid ester compound (II)-1 | | 12 | 8 | 8 | 8 | 8 | 8 |
| Phosphoric acid ester compound (II)-2 | | 2 | 2 | 2 | 2 | 2 | 2 |
| Aromatic carbonate oligomer (III) | | 1 | 1 | 1 | 1 | 2 | 1 |
| Aliphatic polyester resin | | 5 | | | | | |
| Phosphorus organic compound antioxidant (IV) | | | 0.5 | | 0.5 | 0.5 | 0.5 |
| Silicone compound (V) | | | | 0.5 | 0.5 | 0.5 | 0.5 |
| Flame retardancy (0.75 mm thickness) | — | V-2 | V-2 | V-2 | V-2 | V-2 | V-2 |
| Flame retardancy (3 mm thickness) | — | V-2 | V-2 | V-2 | V-2 | V-2 | V-2 |
| Melt flow rate | g/10 min | 36 | 50 | 48 | 48 | 50 | 41 |
| Deflection temperature under load | °C. | 74 | 76 | 76 | 76 | 75 | 75 |
| Charpy impact strength | kJ/m² | 7.5 | 7 | 6 | 6 | 6 | 11 |
| Volatile matter | wt % | 0.6 | 0.3 | 0.3 | 0.4 | 0.5 | 0.6 |

Comparative Examples 1 to 11

The graft copolymer (A), vinyl (co)polymer (B), phosphoric acid ester flame retardant (II), aromatic carbonate oligomer (III), aliphatic polyester resin, aromatic polycarbonate, phosphorus organic compound antioxidant (IV) and silicone compound (V) described in Reference Examples were mixed together at the mixing ratios shown in Table 2, and flame-retardant thermoplastic resin compositions in the form of pellets were produced in the same manner as in Examples. The obtained pellets were molded in the same manner as in Examples, and each molded piece obtained was processed to prepare a test piece for measurement of the deflection temperature under load and the Charpy impact strength. Physical properties of the products of Comparative Examples 1 to 11 were as shown in Table 2.

TABLE 2

|  | Unit | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Graft copolymer (A)-1 | Part by weight | 20 | 20 | 20 | 20 |  | 25 | 20 |
| Graft copolymer (A)-2 |  |  |  |  |  | 25 |  |  |
| Vinyl (co)polymer (B)-1 |  | 40 | 40 | 40 | 40 |  | 70 | 40 |
| Vinyl (co)polymer (B)-2 |  | 40 | 40 | 40 | 40 |  |  | 40 |
| Vinyl (co)polymer (B)-3 |  |  |  |  |  | 75 |  |  |
| Phosphoric acid ester compound (II)-1 |  | 10 | 10 | 5 | 16 | 12 | 14 | 8 |
| Phosphoric acid ester compound (II)-2 |  |  |  |  |  |  |  | 2 |
| Aromatic carbonate oligomer (III) |  |  | 4 | 1 | 1 |  |  |  |
| Aromatic polycarbonate |  |  |  |  |  |  |  |  |
| Aliphatic polyester resin |  |  |  |  |  |  | 5 |  |
| Phosphorus organic compound antioxidant (IV) |  |  |  |  |  |  |  | 0.5 |
| Silicone compound (V) |  |  |  |  |  |  |  | 0.5 |
| Flame retardancy (0.75 mm thickness) | — | V-2 NG | V-2 | V-2 NG | V-2 | V-2 NG | V-2 NG | V-2 NG |
| Flame retardancy (3 mm thickness) | — | V-2 NG | V-2 | V-2 NG | V-2 | V-2 NG | V-2 NG | V-2 NG |
| Melt flow rate | g/10 min | 45 | 57 | 40 | 55 | 31 | 31 | 45 |
| Deflection temperature under load | °C. | 77 | 75 | 81 | 71 | 68 | 75 | 77 |
| Charpy impact strength | kJ/m$^2$ | 7 | 4 | 9 | 3 | 7 | 8 | 6 |
| Volatile matter | wt % | 0.2 | 0.6 | 0.2 | 0.6 | 0.5 | 0.6 | 0.3 |

|  | Unit | Comparative Example 8 | Comparative Example 9 | Comparative Example 10 | Comparative Example 11 |
|---|---|---|---|---|---|
| Graft copolymer (A)-1 | Part by weight | 20 | 20 | 20 | 20 |
| Graft copolymer (A)-2 |  |  |  |  |  |
| Vinyl (co)polymer (B)-1 |  | 40 | 40 | 40 | 40 |
| Vinyl (co)polymer (B)-2 |  | 40 | 40 | 40 | 40 |
| Vinyl (co)polymer (B)-3 |  |  |  |  |  |
| Phosphoric acid ester compound (II)-1 |  | 8 | 5 | 16 | 8 |
| Phosphoric acid ester compound (II)-2 |  | 2 |  |  | 2 |
| Aromatic carbonate oligomer (III) |  | 4 | 1 | 1 |  |
| Aromatic polycarbonate |  |  |  |  | 1 |
| Aliphatic polyester resin |  |  |  |  |  |
| Phosphorus organic compound antioxidant (IV) |  | 0.5 | 0.5 | 0.5 | 0.5 |
| Silicone compound (V) |  | 0.5 | 0.5 | 0.5 | 0.5 |
| Flame retardancy (0.75 mm thickness) | — | V-2 | V-2 NG | V-2 | V-2 NG |
| Flame retardancy (3 mm thickness) | — | V-2 | V-2 NG | V-2 | V-2 NG |
| Melt flow rate | g/10 min | 58 | 45 | 55 | 43 |
| Deflection temperature under load | °C. | 75 | 81 | 71 | 77 |
| Charpy impact strength | kJ/m$^2$ | 4 | 8 | 3 | 7 |
| Volatile matter | wt % | 0.7 | 0.2 | 0.7 | 0.3 |

From the results shown in Tables 1 and 2, the following became clear.

All flame-retardant styrene thermoplastic resin compositions of the present invention (Example 1 to 13) showed well-balanced and excellent flame retardancy, fluidity, heat resistance and mechanical strength. Examples 7 and 8 are cases where the polylactic acid described in Reference Example 6 as an aliphatic polyester resin was added within the range where the object of the present invention was not adversely affected.

On the other hand, in Comparative Examples 1, 5, 6 and 7, the aromatic carbonate oligomer (III) was not added, so that these Comparative Examples showed lower flame retardancy than Examples 1, 5, 7 and 11. In contrast, in Comparative Examples 2 and 8, the amount of the aromatic carbonate oligomer (III) added was large, so that the mechanical strength was lower and the amount of gas produced was larger compared to Examples 1 and 11.

In Comparative Examples 3 and 9, the amount of the phosphoric acid ester flame retardant (II) added was small, so that these showed lower fire retardancy than Examples 1 and 11. On the other hand, in Comparative Examples 4 and 10, the amount of the phosphoric acid ester compound (II) added was large, so that the mechanical strength was lower and the amount of gas produced was larger compared to Examples 1 and 11.

In Comparative Example 11, instead of the aromatic carbonate oligomer (III), the aromatic polycarbonate described in Reference Example 5 having a viscosity average molecular weight [Mv] of 19,000 was added. Comparative Example 11 had lower flame retardancy than Example 11 and was judged to be UL94 V-2NG.

The flame-retardant styrene thermoplastic resin composition of the present invention and molded products thereof have excellent flame retardancy and moldability, and can be applied to various uses such as electrical/electronic components, automobile parts, machine/mechanism parts, and housings and parts for office automation equipment, electrical household appliances and the like. Specific examples of the uses include electrical/electronic components such as various gears, various cases, sensors, LEP lamps, connectors, sockets, resistors, relay cases, switches, coil bobbins, condensers, cases for variable condensers, optical pickups, oscillators, various terminal blocks, transformers, plugs, printed circuit boards, tuners, speakers, microphones, headphones, small motors, magnetic head bases, power modules, housings, semiconductors, liquid crystals, FDD carriages, FDD chassis, motor brush holders, parabolic antennas and computer-related parts; home and office electric appliances such as television parts including VTR parts, television frames, stands and back cabinets, irons, hair driers, rice cooker parts, microwave oven parts, acoustic parts, parts for audio equipment including Laser Disks (registered trademark) and compact disks, illumination parts, refrigerator parts, air conditioner parts, typewriter parts and word processor parts; machine-related parts such as office computer-related parts, telephone-related parts, facsimile-related parts, copier-related parts, washing jigs, various bearings including oil-less bearings, stern bearings and submerged bearings, motor parts, lighters and typewriters; optical instruments/precision machine-related parts such as microscopes, binoculars, cameras and watches; alternator terminals; alternator connectors; IC regulators; various valves such as exhaust gas valves; various fuel-related/exhaust system/inlet system pipes; air intake nozzle snorkels; intake manifolds; fuel pumps; engine cooling water joints; carburetor main bodies; carburetor spacers; exhaust gas sensors; cooling water sensors; oil temperature sensors; brake pad wear sensors; throttle position sensors; crankshaft position sensors; air flow meters; thermostat bases for air conditioners; heater warm air flow control valves; brush holders for radiator motors; water pump impellers; turbine vanes; wiper motor-related parts; distributors; starter switches; starter relays; wire harnesses for transmissions; window washer nozzles; air conditioner panel switch substrates; coils for fuel-related electromagnetic valves; fuse connectors; horn terminals; electric equipment insulating plates; step motor rollers; lamp sockets; lamp housings; brake pistons; solenoid bobbins; engine oil filters; and ignition cases. The flame-retardant styrene thermoplastic resin composition of the present invention and molded products thereof are very useful for these uses.

The invention claimed is:

1. A flame-retardant styrene thermoplastic resin composition comprising 6 to 15 parts by weight of a phosphoric acid ester flame retardant (II) and 0.1 to 3 parts by weight of an aromatic carbonate oligomer (III) having a viscosity average molecular weight [Mv] of 1,000 to 9,000 with respect to 100 parts by weight of a styrene resin (I).

2. The flame-retardant styrene thermoplastic resin composition according to claim 1, wherein said phosphoric acid ester flame retardant (II) is represented by the General Formula 1 below:

General Formula 1

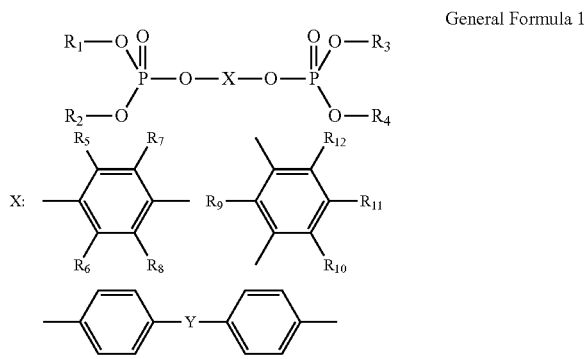

wherein in General Formula 1, each of $R_1$ to $R_4$ represents phenyl, or phenyl substituted with an organic residue(s) having no halogen, and $R_1$ to $R_4$ may be the same with or different from one another; each of $R_5$ to $R_{12}$ represents a hydrogen atom or $C_{1-5}$ alkyl, and $R_5$ to $R_{12}$ may be the same with or different from one another; Y represents any one of a direct bond, O, S, $SO_2$, $C(CH_3)_2$, $CH_2$ and CHPh; and Ph represents phenyl.

3. The flame-retardant styrene thermoplastic resin composition according to claim 1, wherein said aromatic carbonate oligomer (III) is represented by the General Formula 2 below:

General Formula 2

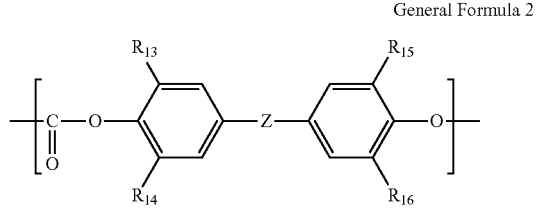

wherein in General Formula 2, Z represents $C_{2-5}$ substituted or unsubstituted alkylidene, cyclohexylidene, oxygen atom, sulfur atom or sulfonyl; and each of $R_{13}$ to $R_{16}$ represents a hydrogen atom or $C_{1-3}$ alkyl, and $R_{13}$ to $R_{16}$ may be the same with or different from one another.

4. The flame-retardant styrene thermoplastic resin composition according to claim 1, wherein said styrene resin (I) is a composition comprising:
- a graft copolymer (A) prepared by graft-copolymerizing a rubber polymer (a) with one or more monomers selected from aromatic vinyl monomers (b), vinyl cyanide monomers (c), unsaturated carboxylic acid alkyl ester monomers (d) and other copolymerizable vinyl monomers (e); and
- a vinyl (co)polymer (B) composed of one or more monomers selected from aromatic vinyl monomers (b), vinyl cyanide monomers (c), unsaturated carboxylic acid alkyl ester monomers (d) and other copolymerizable vinyl monomers (e);

at a weight ratio of 10:90 to 50:50.

5. The flame-retardant styrene thermoplastic resin composition according to claim 1, wherein said phosphoric acid ester flame retardant (II) is resorcinol bis(dixylyl phosphate) (f) and/or resorcinol bis(diphenyl phosphate) (9).

6. The flame-retardant styrene thermoplastic resin composition according to claim 1, further comprising 0.1 to 1 part by weight of a phosphorus organic compound antioxidant (IV).

7. The flame-retardant styrene thermoplastic resin composition according to claim 1, further comprising 0.1 to 1 part by weight of a silicone compound (V).

8. A molded product prepared by molding the flame-retardant styrene thermoplastic resin composition according to claim 1.

9. The molded product according to claim 8, whose flame retardancy satisfies the UL94 V-2 standard.

* * * * *